UNITED STATES PATENT OFFICE.

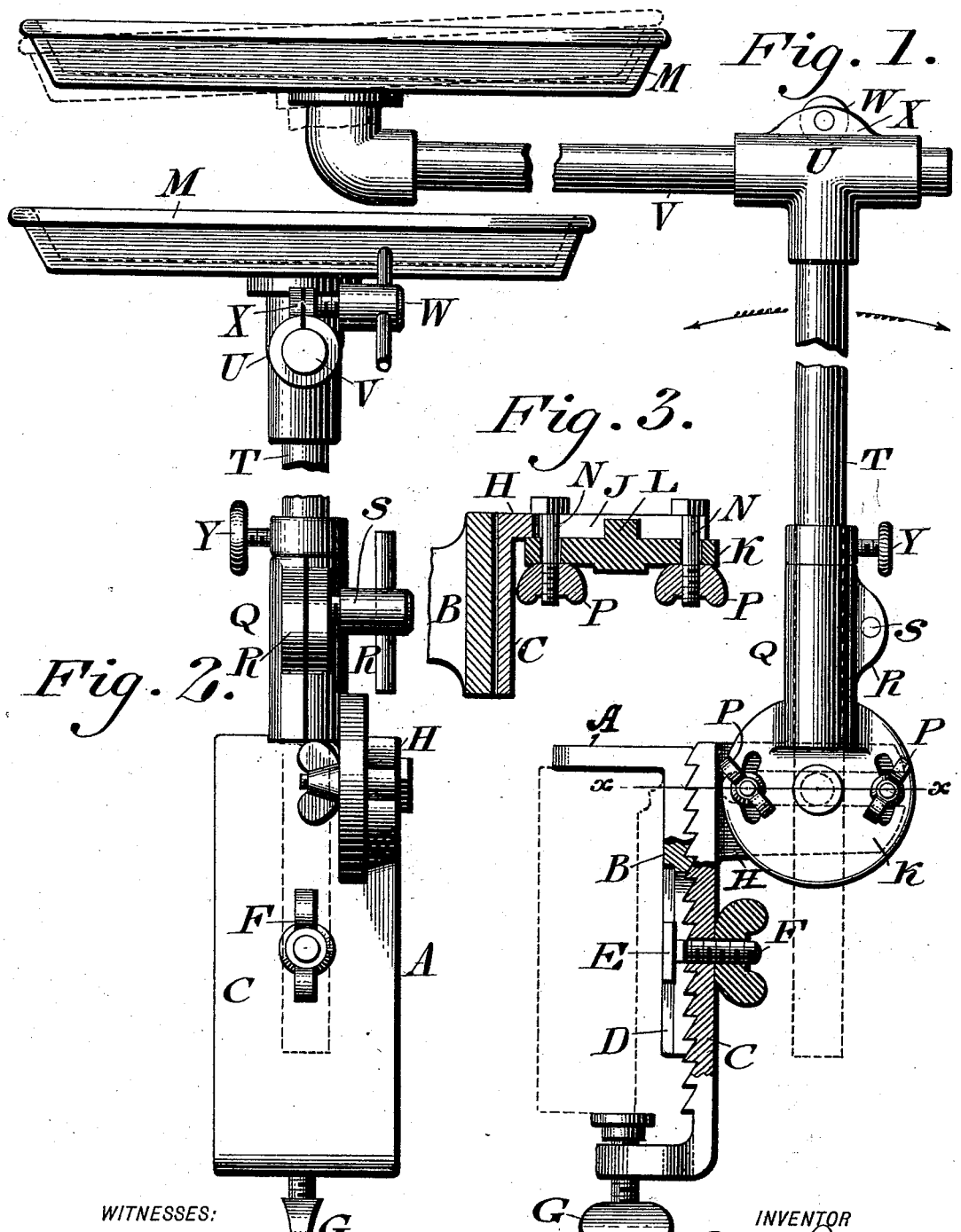

ADAM BENDER, OF PHILADELPHIA, PENNSYLVANIA.

TRAY FOR INVALIDS.

SPECIFICATION forming part of Letters Patent No. 517,677, dated April 3, 1894.

Application filed December 14, 1892. Serial No. 455,110. (No model.)

*To all whom it may concern:*

Be it known that I, ADAM BENDER, a citizen of the United States, residing in the city and county of Philadelphia, State of Pennsylvania, have invented a new and useful Improvement in Trays for Invalids and Others, which improvement is fully set forth in the following specification and accompanying drawings.

My invention consists of a tray which is supported in such manner that it may be adjusted in vertical, horizontal, lateral and angular directions, the same being adapted to be connected with the rail of a bedstead or other piece of furniture, thus providing a convenient device for holding food, dishes, books, &c., and forming a reading and writing desk, and a head rest, as will be appreciated by invalids.

Figure 1 represents a partial side elevation, and partial vertical section of a tray embodying my invention. Fig. 2 represents an elevation at a right angle to Fig. 1. Fig. 3 represents a horizontal section on line $x, x$, Fig. 1.

Similar letters of reference indicate corresponding parts in the several figures.

Referring to the drawings: A designates a clamp which is formed of plates B, C, whose contact faces are serrated or toothed, the plate B having a vertical slot D, in which is freely fitted the head of a screw E, which passes through the plate C, and has a nut F thereon, whereby the clamp may be adjusted to different sizes of rails of bedsteads or other supports, and retain its adjustment, the plate C having at its lower end a screw G thereon, which may be tightened against said support, and thus firmly hold the clamp thereon.

Projecting from the plate C is an arm H, in which is a horizontal slot J, and aside of said arm is a plate K, which has a journal L thereon, the same entering the slot J, whereby said plate K may be rotated for setting the tray M in angular position, as is shown in dotted lines Fig. 1.

Passing through the plate K are bolts N, which are provided with nuts P, and also enter the slot J, whereby by tightening said nuts the plate K may be clamped to the arm H, and the tray M accordingly held in adjusted position.

Rising from the plate K is a split sleeve Q, which is provided with ears R, and a screw S in said ears, said sleeve having passed through it the vertically adjustable spindle T, the upper end of which carries a horizontally-extending split sleeve U, through which passes an arm V, to which the tray M is attached.

The sleeve U has a screw W passed through ears X thereon, and the sleeve Q has a screw Y which is adapted to tighten against the spindle T.

It will be seen that when the screws S and Y are loosened, the spindle, and consequently the tray may be raised and lowered, or vertically adjusted as desired. The spindle may also be rotated so as to adjust the tray in lateral direction, which being accomplished, the screw Y is tightened to retain said lateral adjustment. The screw S is also tightened so as to sustain the spindle and superimposed parts and retain the vertical adjustment thereof.

When the screw W is loosened, the arm V may be moved in and out, so as to set the tray nearer to or farther from the person using the same, and the rod may also be turned in the sleeve so as to tilt the tray to the right or left if so desired, after which the screw W is tightened and the parts retain their adjustment.

When the tray is adjusted, it conveniently supports dishes, food, &c., and provides a writing and reading desk, head rest, &c.

Having thus described my invention, what I claim as new, and desire to secure by Letters Patent, is—

1. A tray, in combination with the horizontally-sliding arm V supporting the same, the split-sleeve U freely receiving said arm, the screw W, the vertically-sliding spindle carrying said sleeve, the split-sleeve Q freely receiving said spindle, the screw S, the slotted plate K connected with said sleeve Q, the journal L on said plate, the bolts N with nuts, and the arm H of the clamp A, said arm having a slot receiving said journal L and bolts N, all substantially as described.

2. A tray support consisting of the adjustable clamp A with arm H having a horizontal slot, the plate K with a journal thereon and openings therein, the bolts N, a split sleeve on said plate, a spindle adjustably secured in said sleeve, a horizontally-extending split sleeve on said spindle, and an arm adjustable in said last mentioned sleeve, said parts being combined substantially as described.

ADAM BENDER.

Witnesses:
JOHN A. WIEDERSHEIM,
A. P. JENNINGS.